US012786262B2

(12) United States Patent
Mahajan et al.

(10) Patent No.: US 12,786,262 B2
(45) Date of Patent: Nov. 3, 2026

(54) TECHNIQUES FOR LIMITING LIVE STREAMING BITRATES

(71) Applicant: NETFLIX, INC., Los Gatos, CA (US)

(72) Inventors: Reenal Mahajan, Sunnyvale, CA (US); David William Pfitzner, St. Peters (AU); Liang Tian, San Marino, CA (US)

(73) Assignee: NETFLIX, INC., Los Gatos, CA (US)

(*) Notice: Subject to any disclaimer, the term of this patent is extended or adjusted under 35 U.S.C. 154(b) by 71 days.

(21) Appl. No.: 19/045,411

(22) Filed: Feb. 4, 2025

(65) Prior Publication Data

US 2026/0230514 A1 Aug. 6, 2026

(51) Int. Cl.
*H04L 65/80* (2022.01)
*H04L 65/61* (2022.01)

(52) U.S. Cl.
CPC .............. *H04L 65/80* (2013.01); *H04L 65/61* (2022.05)

(58) Field of Classification Search
CPC ................................ H04L 65/80; H04L 65/61
See application file for complete search history.

(56) References Cited

U.S. PATENT DOCUMENTS 5,982,748 A * 11/1999 Yin ........................ H04L 47/70 370/468
9,613,042 B1 4/2017 Joseph et al.
9,832,678 B1 * 11/2017 Tandon ................. H04W 76/12
11,102,260 B1 8/2021 Wu et al.
11,930,232 B2 * 3/2024 Yan .................... H04N 21/2662
2003/0095572 A1 * 5/2003 Efthymiou ............ H04L 1/0022 370/468
2015/0295855 A1 * 10/2015 Karthikeyan ....... H04L 43/0876 370/232
2019/0069038 A1 2/2019 Phillips
2026/0050459 A1 * 2/2026 Shivji ..................... G06F 9/453

FOREIGN PATENT DOCUMENTS

KR 20060017019 A * 2/2006 ............. H04N 7/155

OTHER PUBLICATIONS

International Search Report for Application No. PCT/US2026/013767 dated Apr. 8, 2026.

* cited by examiner

*Primary Examiner* — Jonathan A Bui
(74) *Attorney, Agent, or Firm* — Artegis Law Group, LLP

(57) ABSTRACT

In various embodiments, an adaptive bitrate ladder (ABL) application limits streaming bitrates during live events. The ABL application receives a value from an edge server included in a CDN and determines a policy based on the value. The policy includes a maximum bitrate for streaming downloadables associated with a live event. The ABL application transmits the policy to the edge server. The edge server implements the policy to prohibit a client device from requesting a first segment of a first downloadable that is associated with the live event and has a bitrate that exceeds the maximum bitrate.

20 Claims, 3 Drawing Sheets

TECHNIQUES FOR LIMITING LIVE STREAMING BITRATES

BACKGROUND

Field of the Various Embodiments

The various embodiments relate generally to computer science and to video streaming technology and, more specifically, to techniques for limiting live streaming bitrates.

Description of the Related Art

In some approaches to streaming video content to client devices, a video processing pipeline is used to encode discrete portions of a video source based on an encoding ladder to generate segments of different downloadables. Each downloadable is typically associated with a different combination of resolution and bitrate (a "bitrate-resolution point") included in the encoding ladder. The different segments of a downloadable are stored in memory associated with an origin server and subsequently streamed to various client devices, on-demand, via a content delivery network (CDN). In many conventional CDNs, edge servers are implemented at the lowest level of a server hierarchy, where different groups of edge servers are typically geographically proximate to different groups of client devices to which content is delivered. Each edge server usually is capable of caching the segments associated with various downloadables and transmitting those segments to one or more client devices on behalf of the origin server.

When an edge server receives a request from a client device for a segment of a downloadable that is not stored in the cache memory associated with the edge server, the edge server has to relay the request upstream through the CDN until the request either reaches a server that has the requested segment stored in cache memory or reaches the origin server. The response to the request, including the requested segment, is subsequently relayed downstream through the CDN and back to the edge server. The edge server then transmits the response, including the requested segment, to the client device. This type of "on-demand" delivery process works well when streaming pre-generated downloadables for static video sources, such as movies or other media titles. However, for live events, downloadables are incrementally generated in real-time based on live video feeds and typically delivered to large numbers of client devices simultaneously. Consequently, the amount of network traffic generated when delivering the segments associated with a live event to a given edge server for subsequent delivery to a group of corresponding client devices can exceed the bandwidth available to that edge server. When the bandwidth available to an edge server is exceeded, delays in delivering requested segments to the client devices corresponding to the edge server can arise, which can cause playback interruptions on those client devices.

One approach to mitigating the types of playback interruptions described above involves configuring a steering application to redirect network traffic from an overloaded group of edge servers to a different group of edge servers within the CDN on an as-needed basis. Steering network traffic away from overloaded edge servers in this fashion can reduce the network traffic to and from the overloaded edge servers. One drawback of implementing such an approach with live events, however, is that many different groups of edge servers can become overloaded simultaneously during a live event, and network traffic may end up being ineffectually redirected from one group of overloaded edge servers to another group of overloaded edge servers. Further, the resulting increase in overall network traffic caused by steering network traffic within a CDN during a live event can ultimately increase the number and/or severity of playback interruptions experienced by the different client devices during the live event.

As the foregoing illustrates, what is needed in the art are more effective techniques for transmitting segments of downloadables to client devices during live events.

SUMMARY

One embodiment sets forth a computer-implemented method for limiting streaming bitrates during live events. The method includes receiving a first value from a first edge server included in a CDN; determining a first policy based on the first value, where the first policy includes a first maximum bitrate for streaming downloadables associated with a live event; and transmitting the first policy to the first edge server, where the first edge server implements the first policy to prohibit a first client device from requesting a first segment of a first downloadable that is associated with the live event and has a first bitrate that exceeds the first maximum bitrate.

At least one technical advantage of the disclosed techniques relative to the prior art is that, with the disclosed techniques, if network traffic to and from a given group of edge servers in a CDN exceeds during a live event a pre-determined threshold, then the group of edge servers can impose on any number of corresponding client devices a maximum bitrate associated with the downloadables requested by those client devices. Limiting client devices to requesting and streaming segments of downloadables associated with lower bitrates can substantially reduce both the network traffic to and from the given group of edge servers as well as overall network traffic within the CDN, which can mitigate the risk of playback interruptions during the live event. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
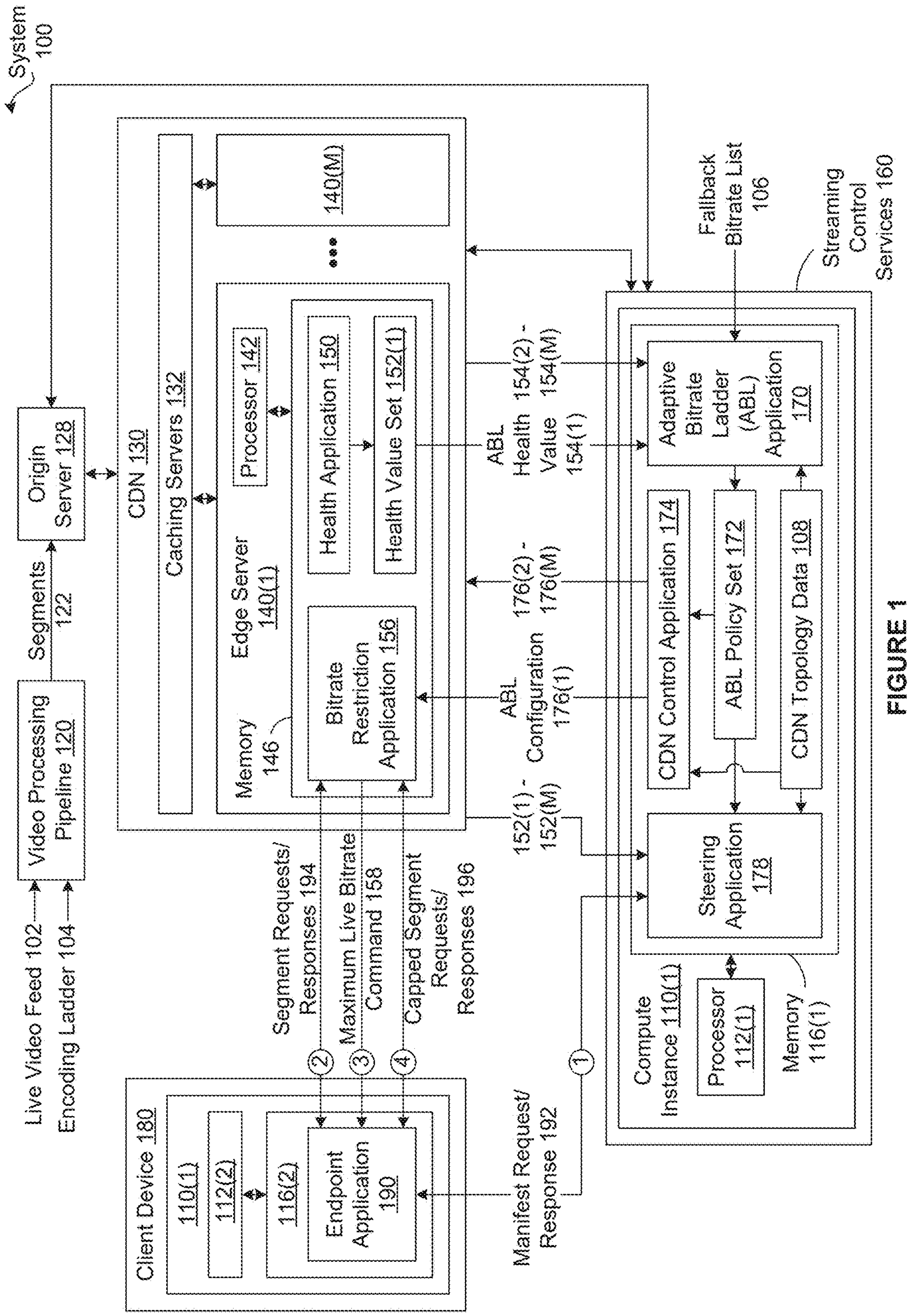
FIG. 1 is a conceptual illustration of a system configured to implement one or more aspects of the various embodiments

In the following description, numerous specific details are set forth to provide a more thorough understanding of the various embodiments. However, it will be apparent to one skilled in the art that the inventive concepts may be practiced without one or more of these specific details. For explanatory purposes, multiple instances or versions of like objects are denoted with reference numbers identifying the object and parenthetical alphanumeric character(s) identifying the instance where needed.

To stream a live event in real-time to a variety of different client devices, a typical streaming media service encodes at least one live media feed based on an encoding ladder to generate multiple downloadables that are associated with different combinations of bitrates and resolutions. As different segments of the downloadables are generated, the segments are stored in an origin server and distributed to a CDN on-demand. In many implementations, a CDN includes multiple edge servers that are distributed across different geographical regions. In response to requests from client devices in the associated geographical region, each edge server downloads from the origin server, caches, and delivers requested segments of downloadables.

One drawback of this type of on-demand delivery process is that during live events segments are typically delivered to large numbers of client devices simultaneously. As a result, the amount of network traffic can exceed the bandwidth available to one or more edge servers. When the bandwidth available to an edge server is exceeded, delays in delivering requested segments to corresponding client devices can cause playback interruptions on those client devices.

One approach to mitigating these types of playback interruptions involves configuring a steering application to redirect network traffic from an overloaded group of edge servers to a different group of edge servers within the CDN on an as-needed basis. However, if many different groups of edge servers become overloaded simultaneously during a live event, the steering application may ineffectually redirect network traffic from one group of overloaded edge servers to another group of overloaded edge servers. Since redirecting network traffic in this fashion increases overall network traffic, the number and/or severity of playback interruptions experienced by the different client devices during the live event can actually increase.

With the disclosed techniques, however, an adaptive bitrate ladder (ABL) application periodically identifies "unhealthy" groups of one or more edge servers that are overloaded or at risk of becoming overloaded based on the amount of live network traffic to and from each edge server. For each unhealthy group of edge servers, the ABL application determines an ABL policy that specifies at least one maximum bitrate and at least one percentage of live network traffic to which the maximum bitrate is to be applied. The ABL application transmits each policy to the associated group of edge servers for implementation.

For each maximum bitrate and associated percentage of live network traffic specified in an ABL policy received by an edge server, the edge server selects a subset of corresponding client devices based on the percentage of live network traffic. The edge server then transmits a maximum bitrate command to the selected client devices, where the maximum bitrate command prohibits the selected client devices from requesting and therefore streaming segments of downloadables that are associated with the live event and have bitrates that exceed the maximum bitrate.

At least one technical advantage of the disclosed techniques relative to the prior art is that upon detecting an unhealthy group of edge servers during a live event, the ABL application can reduce both network traffic to and from the unhealthy group of edge servers as well as overall network traffic within the CDN. More precisely, the ABL application can limit at least some client devices corresponding to the unhealthy group of edge servers to requesting and streaming segments of downloadables having bitrates that exceed a maximum bitrate. Accordingly, the network traffic to and from the given group of edge servers, the overall network traffic within the CDN, and the likelihood of playback interruptions during the live event can be reduced. These technical advantages provide one or more technological improvements over prior art approaches.

System Overview

FIG. 1 is a conceptual illustration of a system 100 configured to implement one or more aspects of the various embodiments. As shown, in some embodiments, the system 100 includes, without limitation, a video processing pipeline 120, an origin server 128, a CDN 130, streaming control services 160, and a client device 180. In some other embodiments, the system 100 can further include, without limitation, one or more other origin servers, one or more other video processing pipelines, one or more other CDNs, any number and/or types of other streaming services, one or more other client devices, or any combination thereof.

Any number of the components of the system 100 can be distributed across multiple geographic locations or implemented in one or more cloud computing environments (e.g., encapsulated shared resources, software, data) in any combination. In some embodiments, the video processing pipeline 120, the origin server 128, the CDN 130, the streaming control services 160, or any combination thereof can be implemented in a cloud computing environment, implemented as part of any other distributed computing environment, or implemented in a stand-alone fashion.

For explanatory purposes, the functionality of the video processing pipeline 120, the origin server 128, the CDN 130, the streaming control services 160, and the client device 180 are described below in the context of streaming a live video feed 102 associated with a live event to the client device 180 and any number of other client devices (not shown) via the CDN 130. Note, however, that the techniques described herein are illustrative rather than restrictive. Many modifications and variations will be apparent to those of ordinary skill in the art without departing from the scope and spirit of the described embodiments and techniques.

In particular, the techniques described herein can be modified and applied to streaming any number of live video feeds associated with any number of live events to any number of client devices. Some examples of live events are a live sporting event, a live television show, a live performance, a live speech, and a live meeting. Each live event can be associated with any number of different live media feeds, where each live media feed is associated with a different source (e.g., a different camera).

The video processing pipeline 120 incrementally generates any number and/or types of downloadables based on a live video feed 102 associated with the live event and an encoding ladder 104 associated with the live event. The encoding ladder 104 includes, without limitation, any number of bitrate-resolution points, where each bitrate-resolution point is a different combination of bitrate and resolution. More specifically, throughout the live event, the video processing pipeline 120 encodes the live video feed 102 in real-time across the bitrate-resolution points included in the encoding ladder 104 to generate segments 122. The segments 122 include, without limitation, any number of segments of any number of downloadables derived from the live video feed 102, where each downloadable corresponds to a different combination of bitrate and resolution as per the encoding ladder 104.

For explanatory purposes, a segment of a downloadable is also referred to herein as a "segment." Each downloadable generated based on the live video feed 102 includes, without limitation, a sequence of one or more discrete, time-based segments that correspond (in a playback timeline) to a sequence of one or more discrete source segments of the live video feed 102. Accordingly, the video processing pipeline 120 encodes a different portion of the live video feed 102 to generate each segment of one or more downloadables In some embodiments, the video processing pipeline 120 independently encodes each portion of the live video feed 102 to ensure that each corresponding segment can be decoded independently of any other segments. Ensuring that each segment can be independently decoded enable the client device 180 and any number of other client devices (not shown) to switch between downloadables generated based on the live video feed 102 at segment boundaries during playback.

As the video processing pipeline 120 generates the segments 122, the segments 122 are stored in the origin server 128. Although not shown, the origin server 128 is a compute instance that includes, without limitation, any number and/or types of processors, any amount and/or types of memories, and optionally any amount and/or types of storage. In operation, the origin server 128 provides the segments 122 on-demand to the CDN 130.

The CDN 130 delivers the segments 122 on behalf of the origin server 128 to the client device 180 and any number of other client devices. As shown, the CDN 130 includes, without limitation, an edge server 140(1)-an edge server 140(M) and caching servers 132, where M can be any positive integer. Each of the edge server 140(1)-the edge server 140(M) and the caching servers 132 is a proxy server that is capable of selectively caching segments of downloadables. The edge server 140(1)-the edge server 140(M) are implemented at the lowest level of a server hierarchy and the caching servers 132 are implemented at higher levels of the server hierarchy. For explanatory purposes, the edge server 140(1)-the edge server 140(M) are also referred to herein individually as an "edge server 140" and collectively as "edge servers 140."

The edge servers 140 receive requests for segments from and transmit responses that include segments to the client device 180 and any number of other client devices on behalf of the origin server 128. A subset of the caching servers 132 that are implemented at the highest level of the server hierarchy transmit requests to and receive response from the origin server 128 on behalf of the client device 180 and any number of other client devices. Each of the edge servers 140 and the caching servers 132 is a compute instance that includes, without limitation, any number and/or types of processors, any amount and/or types of memories, and optionally any amount and/or types of storage.

As shown, in some embodiments, the edge server 140(1) is a compute instance that includes, without limitation, a processor 142 and a memory 146. The processor 142 can be any instruction execution system, apparatus, or device capable of executing instructions. For example, the processor 142 could comprise a central processing unit, a graphics processing unit, a controller, a microcontroller, a state machine, or any combination thereof.

The memory 146 stores content, such as software applications and data, for use by the processor 142. The memory 146 can be one or more of a readily available memory, such as random-access memory, read only memory, floppy disk, hard disk, storage drive, or any other form of digital storage, local or remote. In some embodiments, a storage (not shown) may supplement or replace the memory 146. The storage may include any number and type of external memories that are accessible to the processor 142 of the edge server 140(1). For example, and without limitation, the storage can include a Secure Digital Card, an external Flash memory, a portable compact disc read-only memory, an optical storage device, a magnetic storage device, a storage drive, or any suitable combination of the foregoing.

The streaming control services 160 includes, without limitation, microservices, databases, and storage for activities and content associated with a streaming media service that are allocated to none of the video processing pipeline 120, the origin server 128, the CDN 130, or client devices (e.g., the client device 180). Some examples of functionality that the streaming control services 160 can provide include, without limitation, login and billing, personalized live event and media title recommendations, video transcoding, server and connection health monitoring, and client-specific CDN guidance. The streaming control services 160 includes, without limitation, a compute instance 110(1) and zero or more other compute instances (not shown).

As shown, the compute instance 110(1) includes, without limitation, a processor 112(1) and a memory 116(1). The processor 112(1) can be any instruction execution system, apparatus, or device capable of executing instructions. For example, the processor 112(1) could comprise a central processing unit, a graphics processing unit, a controller, a microcontroller, a state machine, or any combination thereof.

The memory 116(1) stores content, such as software applications and data, for use by the processor 112(1). The memory 116(1) can be one or more of a readily available memory, such as random-access memory, read only memory, floppy disk, hard disk, storage drive, or any other form of digital storage, local or remote. In some embodiments, a storage (not shown) may supplement or replace the memory 116(1). The storage may include any number and type of external memories that are accessible to the processor 112(1) of the compute instance 110(1). For example, and without limitation, the storage can include a Secure Digital Card, an external Flash memory, a portable compact disc read-only memory, an optical storage device, a magnetic storage device, a storage drive, or any suitable combination of the foregoing.

The compute instance 110(1) and any other compute instances included in the streaming control services 160 can be implemented in a cloud computing environment, implemented as part of any other distributed computing environment, or implemented in a stand-alone fashion. Any number of software applications included in the streaming control services 160 can interact with the origin server 128, the CDN 130, the edge servers 140, the caching servers 132, the client device 180, any number of other client devices, any number and/or types of other devices, any number and/or types of users, or any combination thereof.

In some embodiments, each of the compute instance 110(1) and any number of other compute instances included in the streaming control services 160 can include, without limitation, any number of other processors and any number of other memories in any combination. In particular, the compute instance 110(1) and/or one or more other compute instances included in the streaming control services 160 can provide a multiprocessing environment in any technically feasible fashion.

Each of the client device 180 and zero or more other client devices can be any type of device that includes one or more compute instances and is capable of requesting, decoding, and playing back segments of downloadables. Some examples of client devices include, without limitation, desktop computers, laptops, smartphones, smart televisions, game consoles, tablets, and set-top boxes.

As shown, in some embodiments, the client device 180 includes, without limitation, a compute instance 110(2). The compute instance 110(2) includes, without limitation, a processor 112(2) and a memory 116(2). The processor 112(2) can be any instruction execution system, apparatus, or device capable of executing instructions. For example, the processor 112(2) could comprise a central processing unit, a graphics processing unit, a controller, a microcontroller, a state machine, or any combination thereof.

The memory 116(2) stores content, such as software applications and data, for use by the processor 112(2). The memory 116(2) can be one or more of a readily available memory, such as random-access memory, read only memory, floppy disk, hard disk, storage drive, or any other form of digital storage, local or remote. In some embodiments, a storage (not shown) may supplement or replace the memory 116(12). The storage may include any number and type of external memories that are accessible to the processor 112(2) of the compute instance 110(2). For example, and without limitation, the storage can include a Secure Digital Card, an external Flash memory, a portable compact disc read-only memory, an optical storage device, a magnetic storage device, a storage drive, or any suitable combination of the foregoing.

In general, each compute instance (including the origin server 128, each of the caching servers 132, each of the edge servers 140, the compute instance 110(1), and the compute instance 110(2) is configured to implement one or more software applications. For explanatory purposes, each software application is described as residing in the memory of a single compute instance and executing on the processor of the same compute instance. However, in some embodiments, the functionality of each software application can be distributed across any number of other software applications that reside in the memories of any number of compute instances and execute on the processors of any number of compute instances in any combination. Further, the functionality of any number of software applications can be consolidated into a single software application.

In many implementations, in order to stream a live event, a client device (e.g., the client device 180) transmits a request for a manifest file to the streaming control services 160. In response, the streaming control services 160 generates a manifest file that describes any number of downloadables associated with the live event. More precisely, each manifest file describes one or more downloadables that are generated in real-time during the live event, the corresponding resolution/bitrate points, and any number and/or types of playback instructions.

The playback instructions can be used by a client device to determine when and how to request segments of downloadables from the CDN 130. As described previously herein, in many embodiments, a client device can switch between downloadables generated based on the same live video feed at segment boundaries during playback. In particular, the client device can switch between downloadables associated with different bitrates to alter an associated "live streaming bitrate" while playing back a live event. As used herein a "live streaming bitrate" is a bitrate associated with streaming a live event. Downloadables derived from the same live video feed and the corresponding resolution/bitrate points are also referred to herein as a "bitrate ladder" for that live video feed.

As described previously herein, because the downloadables associated with a live event are incrementally generated based on live video feeds in real-time, new segments of downloadables associated with the live event are typically requested by and delivered to a large number of client devices simultaneously. As a result, at various points-in-time during a live event, the amount of network traffic required to deliver segments via an edge server to corresponding client devices can exceed the available bandwidth for that edge server, which can cause playback interruptions on those client devices.

One conventional approach to mitigating the types of playback interruptions described above involves configuring a conventional steering application to redirect network traffic from an overloaded group of edge servers to a different group of edge servers within a CDN on an as-needed basis. One drawback of this approach in the context of a live event is that oftentimes network traffic can end up being ineffectually redirected from one overloaded group of edge servers to another overloaded group of edge servers. And the resulting increase in overall network traffic associated with the CDN can ultimately increase the number and/or severity of playback interruptions experienced by client devices during the live event.

Selectively Limiting Live Streaming Bitrates

To address the above problems, the system 100 is configured to implement server-side adaptive bitrate ladder (ABL) techniques when streaming the live event. As used herein server-side ABL techniques adaptively limit live streaming bitrates for selected client devices below one or more per-determined maximum bitrates in response to undesirably low values of an ABL health metric associated with one or more edge servers in a CDN. In some embodiments, each of any number of the edge servers 140 can implement one or more ABL policies to prohibit one or more groups of client devices from requesting segments associated with downloadables having bitrates that exceed one or more corresponding maximum bitrates. In this fashion, one or more of the highest bitrates are effectively removed from the bitrate ladder used by the one or more groups of client devices to stream the live event. As a result, both the network traffic to and from one or more edge servers 140 as well as overall network traffic within the CDN 130 can be significantly reduced.

Each of the edge servers 140 includes, without limitation, a different instance of a health application 150. As shown, an instance of the health application 150 resides in the memory 146 of the edge server 140(1) and executes on the processor 142 of the edge server 140(1). Although not shown, a different instance of the health application 150 resides in the memory of each of the edge server 140(2)-edge server 140(M) and executes on the processor of each of the edge server 140(2)-the edge server 140(M), respectively.

The instances of the health application 150 executing on the edge server 140(1)-the edge server 140(M) periodically (e.g., every 15 seconds) generate a health value set 152(1)-a health value set 152(M), respectively, based on any number and/or types of measurements associated with the edge server 140(1)-the edge server 140(M), respectively. For explanatory purposes, the health value set 152(1)-the health value set 152(M) are also referred to herein individually as a "health value set 152" and collectively as "health value sets 152."

The health value set 152(1)-the health value set 152(M) include, without limitation, an ABL health value 154(1)-an ABL health value 154(M), respectively, and different values for any number and/or types of steering health metrics. The ABL health value is a value for a health metric that guides ABL decisions and optionally guides, at least in part, steering decisions. The value(s) for the steering health metric(s) guide, at least in part, steering decisions. As used herein, an "ABL" decision is a decision regarding adaptively limiting live streaming bitrates for any number (including none) of client devices. As used herein, a "steering" decision is a decision regarding redirecting any amount (including none) of network traffic from a group of one or more edge servers to a different group of edge servers within the CDN 130.

In some embodiments, the instances of the health application 150 executing on the edge server 140(1)-the edge server 140(M) generate the ABL health value 154(1)-the ABL health value 154(M), respectively, based on at least one of network traffic, network bandwidth usage, processor use, or load being imparted on a storage device (e.g., a solid-state drive, a non-volatile memory express drive) associated with the edge server 140(1)-the edge server 140(M), respectively. For instance, in some embodiments, the health application 150 executing on the edge server 140(1) generates an ABL health value based network bandwidth usage associated with the edge server 140(1) and use of the processor 142. For explanatory purposes, the ABL health value 154(1)-the ABL health value 154(M) are also referred to herein individually as an "ABL health value 154" and collectively as "ABL health values 154."

The health application 150 can generate any type of ABL health value 154 in any technically feasible fashion. In some embodiments, each ABL health value 154 is a floating point number that can range from 0.0 through 1.0. An ABL health value of 0.0 for one or more edge servers indicates that all live network traffic associated with the edge server(s) should be capped at the lowest of any number of fallback bitrates and 1.0 indicates that no live network traffic associated with the edge server(s) should be capped. As used herein "live network traffic" associated with edge server(s) refers to network traffic associated with transmitting segments of downloadables associated with live events from the edge server(s) to client devices on-demand.

In the same or other embodiments, the health application 150 implements a proportional-integral-derivative (PID) controller (not shown) to periodically generate the ABL health value 154. The input to the PID controller is at least one of network traffic, network bandwidth usage, processor use, or load being imparted on a storage device associated with the edge server 140. In operation, the PID controller attempts to adjust the ABL health value 154 in order to maintain each input approximately at or less than a corresponding pre-configured limit. For instance, in some embodiments, the PID controller attempts to adjust the ABL health value 154 in order to maintain network bandwidth usage at a value of 0.85 (representing 85% of the available network bandwidth).

As shown, as the edge servers 140 generate or regenerate the health value sets 152, the edge servers 140 transmit the ABL health values 154 to an ABL application 170 and the health value sets 152 to a steering application 178. The ABL application 170 and the steering application 178 are included in the streaming control services 160. More specifically, the ABL application 170 and the steering application 178 reside in the memory 116(1) of the compute instance 110(1) and execute on the processor 112(1) of the compute instance 110(1).

As shown, upon receiving the ABL health values 154, the ABL application 170 generates a new version of an ABL policy set 172 based on the ABL health values 154, a fallback bitrate list 106, and CDN topology data 108. More precisely, as the ABL application 170 receives new versions of the ABL health values 154, the ABL application generates new versions of the ABL policy set 172 based on the new versions of the ABL health values 154, the fallback bitrate list 106, and the CDN topology data 108. Accordingly, the ABL application 170 periodically generates a new version of the ABL policy set 172.

The fallback bitrate list 106 includes, without limitation, any number of fallback bitrates, where each fallback bitrate is associated with a different fallback bitrate-resolution point included in the encoding ladder 104 used to stream the live event. As used herein, a "fallback bitrate-resolution point" is a bitrate-resolution point included in the encoding ladder 104 that provides a visually effective fallback for one or more bitrate-resolution points included in the encoding ladder 104 that are prohibited when a corresponding maximum bitrate is imposed. Accordingly, each fallback bitrate is equal to or higher than a bitrate specified in a corresponding fallback bitrate-resolution point. Any number of fallback bitrates can be determined in any technically feasible fashion.

The CDN topology data 108 includes, without limitation, any amount and/or types of data associated with the topology of the CDN 130. In some embodiments, the CDN topology data 108 indicates stacks of edge servers 140, groups of edge servers 140 that are associated with each of any number of Autonomous System Numbers (ASNs), and groups of edge servers 140 that are associated with each of any number of countries. As used herein a "stack" of edge servers 140 is a group of edge servers 140 that are connected to a single router. If edge server 140 serves or delivers segments of downloadables via a given ASN, then the edge server 140 is associated with the given ASN. If edge server 140 serves or delivers segments of downloadables to client devices located in a given country, then the edge server 140 is associated with the given country. The streaming control services 160 can determine the CDN topology data 108 in any technically feasible fashion.

As described in greater detail below in conjunction with FIG. 2, the ABL policy set 172 includes, without limitation, any number of ABL policies, where each ABL policy is associated with a different edge server, stack, ASN, or country. Each ABL policy includes, without limitation, one or more maximum bitrates and one or more corresponding percentages of live network traffic to which the maximum bitrates should be applied. In some embodiments, each maximum bitrate in a given ABL policy is a different fallback bitrate that is included in the fallback bitrate list 106.

For example, if the fallback bitrate list 106 specified two fallback bitrates of 4000 kbps and 1500 kbps, then an ABL policy for a stack could specify that 30% of live network traffic should be capped to a 4000 kbps maximum bitrate and 70% of live network traffic should be capped to a 1500 kbps maximum bitrate. For explanatory purposes, a percentage of live network traffic is also referred to herein as a "live network traffic percentage."

The ABL application 170 can determine the ABL policy set 172 in any technically feasible fashion that is consistent with mitigating a risk of playback interruptions during the live event. In some embodiments, upon receiving a new version of the ABL health values 154, the ABL application 170 compares the ABL health values to a health threshold (not shown in FIG. 1) to identify unhealthy edge servers. The ABL application 170 uses escalation criteria (not shown in FIG. 1) to identify unhealthy stacks, unhealthy ASNs and unhealthy countries based on the unhealthy edge servers and the CDN topology data 108. The escalation criteria can specify any amount and/or types of criteria for identifying unhealthy stacks, unhealthy ASNs and unhealthy countries. For each stack, unhealthy ASN, and unhealthy country, the ABL application 170 computes a different ABL value based on the ABL values of the associated edge servers. An ABL value for a stack, an ASN, or a country is also referred to herein as a "composite ABL value" and a "composite value" for the ABL metric.

The ABL application 170 then selects unhealthy edge servers that are not included in unhealthy stacks, and unhealthy stacks associated with neither unhealthy countries nor unhealthy ASNs. Notably, in the context of the CDN 130, edge servers have relatively narrow scopes, stacks have moderate scopes, and countries and ASNs have relatively broad scopes. Accordingly, the selected edge servers, the selected stacks, unhealthy ASNs, and unhealthy countries represent each portion of the CDN 130 that the ABL application 170 identifies as unhealthy at a broadest scope. For each selected edge server, selected stack, unhealthy ASN, and unhealthy country, the ABL application 170 determines an ABL policy based on associated ABL values and the fallback bitrate list 106.

Each ABL policy is associated with a different edge server 140, a different stack, a different ASN, or a different country. Although not shown, each ABL policy includes, without limitation, any number of maximum bitrates and a different live network traffic percentage for each maximum bitrate. Notably, the number of maximum bitrates can vary between ABL policies. For instance, one ABL policy can include two maximum bitrates and two live network traffic percentages, and another ABL policy can include one maximum bitrate and one live network traffic percentage. Each live network traffic percentage specifies a percentage of live streaming traffic to which the corresponding maximum bitrate should be applied.

The ABL application 170 can generate an ABL policy based on an ABL value and the fallback bitrate list 106 in any technically feasible fashion. For instance, in some embodiments, the ABL application selects 170 at least one maximum bitrate from the fallback bitrate list 106 based on the ABL value and computes a different live network traffic percentage for each maximum bitrate based on the ABL value. The ABL application 170 aggregates the newly generated ABL policies to generate a new version of the ABL policy set 172 for subsequent use by a CDN control application 174 and a steering application 178. The ABL application 170 is described in greater detail below in conjunction with FIG. 2.

As shown, the CDN control application 174 is included in the streaming control services 160. More specifically, the CDN control application 174 resides in the memory 116(1) of the compute instance 110(1) and executes on the processor 112(1) of the compute instance 110(1). As shown, the CDN control application 174 generates and transmits to the edge server 140(1)-the edge server 140(M) a new version of an ABL configuration 176(1)-an ABL configuration 176(M), respectively, based on each new version of the ABL policy set 172 and the CDN topology data 108. For explanatory purposes, the ABL configuration 176(1)-the ABL configuration 176(M) are also referred to herein individually as an "ABL configuration 176" and collectively as "ABL configurations 176."

The ABL configuration 176(1)-the ABL configuration 176(M) each include zero or more of the ABL policies from the ABL policy set 172 that are applicable to the edge server 140(1)-the edge server 140(M), respectively. Accordingly, each ABL configuration 176 can include no ABL policies, a single ABL policy for an edge server, a single ABL policy for a stack, or one or more ABL policies that are each associated with a different ASN or a different country.

To generate the ABL configuration 176 for a given edge server, the CDN control application 174 determines whether the ABL policy set 172 includes an ABL policy for the given edge server. If the ABL policy set 172 includes an ABL policy for the given edge server, then the CDN control application 174 generates the ABL configuration 176 that specifies the ABL policy for the given edge server. Otherwise, the CDN control application 174 determines whether the ABL policy set 172 includes an ABL policy for the stack that includes the given edge server. If the ABL policy set 172 includes an ABL policy for the stack, then the CDN control application 174 generates the ABL configuration 176 that specifies the ABL policy for the stack. Otherwise, the CDN control application 174 selects any ABL policies that are associated with any countries or ASNs that the given edge server serves. The CDN control application 174 then generates the ABL configuration 176 that specifies the selected ABL policies. Note that if no ABL policies are selected, then the CDN control application 174 generates an empty ABL configuration for the given edge server.

As shown, each of the edge servers 140 includes, without limitation, a different instance of the bitrate restriction application 156. As shown, an instance of the bitrate restriction application 156 resides in the memory 146 of the edge server 140(1) and executes on the processor 142 of the edge server 140(1). Although not shown, a different instance of the bitrate restriction application 156 resides in the memory of each of the edge server 140(2)-edge server 140(M) and executes on the processor of each of the edge server 140(2)-the edge server 140(M).

The bitrate restriction application 156 implements each ABL policy included in each of the ABL configurations 176 to prohibit any number of corresponding client devices from requesting one or more segments of one or more downloadables that are associated with the live event and have bitrates that exceed at least one maximum bitrate specified in the ABL policy. Prohibiting a client device from requesting one or more segments of one or more downloadables that are associated with a live event and have bitrate that exceed a maximum bitrate is also referred to herein as "limiting a live streaming bitrate" for the client device.

To limit a live streaming bitrate for a client device to a given maximum bitrate, the bitrate restriction application 156 transmits a maximum bitrate command specifying the given maximum bitrate to the client device. Notably, the limit imposed on a client device by a maximum bitrate command extends until the client device receives a new maximum bitrate command. To remove any limit on a live streaming bitrate for a client device, the bitrate restriction application 156 transmits a maximum bitrate command specifying a value indicating that no maximum bitrate is to be applied.

For explanatory purposes, the functionality of the bitrate restriction application 156 is described herein in the context of the instance of the bitrate restriction application 156 executing on the edge server 140(1). Upon receiving the ABL configuration 176(1), the bitrate restriction application 156 limits as per the ABL configuration 176(1) the live streaming bitrates for a subset (including all or none) of client devices served by the edge server 140(1) that are streaming the live event. The bitrate restriction application 156 removes any limits on live streaming bitrates for client devices served by the edge server 140(1) that are streaming the live event and are not included in that subset of client devices.

To limit the live streaming bitrates for the subset of client devices, the bitrate restriction application 156 implements each ABL policy included in the ABL configuration 176(1). To implement an ABL policy associated with the edge server 140(1) or the stack that includes the edge server 140(1), the bitrate restriction application 156 selects all the client devices served by the edge server 140(1) that are streaming the live event. For each maximum bitrate and corresponding live streaming percentage included in the ABL policy, the bitrate restriction application 156 generates a different maximum bitrate command specifying the maximum bitrate. The bitrate restriction application 156 then transmits each maximum bitrate command to a percentage of the selected client devices that is equal to the corresponding live streaming percentage.

To implement an ABL policy associated with an ASN or a country associated with the edge server 140(1), the bitrate restriction application 156 selects all the client devices served by the edge server 140(1) that are streaming the live event and are associated with the ASN or the country. For each maximum bitrate and corresponding live streaming percentage included in the ABL policy, the bitrate restriction application 156 generates a different maximum bitrate command specifying the maximum bitrate. The bitrate restriction application 156 then transmits each maximum bitrate command to a percentage of the selected client devices that is equal to the corresponding live streaming percentage.

As persons skilled in the art will recognize, the bitrate restriction application 156 adaptively limits live streaming bitrates for client devices after the client devices begin streaming the live event. In some embodiments, the steering application 178 can selectively include a maximum bitrate in manifest files, thereby limiting live streaming bitrates for client devices before the client devices begin streaming the live event. In operation, the steering application 178 generates any number of manifest files for the client device 180 and any number of other client devices on-demand based on the health value sets 152, the CDN topology data 108, and optionally the ABL policy set 172.

As described previously herein, each manifest file describes one or more downloadables that are generated in real-time during the live event, corresponding resolution/bitrate points, and any number and/or types of playback instructions. As part of generating a manifest file for a client device, the steering application 178 selects one or more edge servers 140 based on the health value sets 152 and the CDN topology data 108, and instructs, via the manifest file, the client device to request segments 122 from one of the selected edge servers.

Importantly, the steering application 178 can also include a maximum bitrate in a manifest file. Prior to the live event, the steering application 178 can be configured to include a "preemptive" maximum bitrate in any number of manifest files to reduce the network traffic at the start of the live event. After the live event has started, if the steering application 178 receives a request from a client device for a manifest file to enable the client device to begin streaming the live event, then the steering application 178 determines whether to apply a maximum bitrate to the client device based on the ABL policy set 172 and the CDN topology data 108. If the steering application 178 determines to apply a maximum bitrate to the client device, then the steering application 178 specifies the maximum bitrate in the manifest file.

The steering application 178 can determine whether to apply a maximum bitrate to a client device in any technically feasible fashion. In some embodiments, the steering application 178 implements techniques described previously herein in conjunction with CDN control application 174 and the bitrate restriction application 156 to limit live streaming bitrates for any number of client devices in accordance with the ABL policy set 172.

As shown, the client device 180 includes, without limitation, an endpoint application 190. More precisely, the endpoint application 190 resides in the memory 116(2) of the compute instance 110(2) and executes on the processor 112(2) of the compute instance 110(2). Although not shown, a different instance of the endpoint application 190 executes on each of any number of other client devices. The endpoint application 190 enables the client devices to request segments of downloadables from the CDN 130 in order to stream any number of live events and/or any number of static video sources.

Importantly, prior to a live event, the endpoint application 190 interacts with the steering application 178 to obtain a manifest file for the live event. Subsequently, the endpoint application 190 interacts with one or more of the edge servers 140 to request and receive segments of downloadables associated with the live event. Notably, if the manifest file includes a maximum bitrate, then the endpoint application 190 refrains from requesting any segments of any downloadables that are associated with the live event and have bitrates greater than the maximum bitrate until receiving from the bitrate restriction application 156 a maximum bitrate command specifying a different maximum bitrate or a value indicating that no maximum bitrate is to be applied.

Similarly, during the live event, if the endpoint application 190 receives from the bitrate restriction application 156 a maximum bitrate command specifying a maximum bitrate, then the endpoint application 190 refrains from requesting any segments of any downloadables that are associated with the live event and have bitrates greater than the maximum bitrate until receiving from the bitrate restriction application 156 a maximum bitrate command specifying a different maximum bitrate or a value indicating that no maximum bitrate is to be applied.

For explanatory purposes, FIG. 1 depicts a series of circles numbered 1-4 that correspond to a sequence of exemplary events associated with streaming the live event to the client device 180. As depicted with a circle numbered 1 and a label "manifest request/response 192," prior to the live event, the endpoint application 190 requests and receives from the steering application 178 a manifest file for the live event. For explanatory purposes, the manifest file does not include a maximum bitrate and instructs the client device 180 to preferentially request segments of downloadables associated with the live event from the edge server 140(1).

As depicted with a circle numbered 2 and a label "segment requests/responses 194," during a first portion of the live event, the endpoint application 190 requests and receives from the edge server 140(1) segments of a downloadable that is associated with the live event and has a bitrate denoted herein as BR1. Subsequently, as depicted with a circle numbered 3, the client device 180 receives a maximum live bitrate command 158 from the bitrate restriction application 156. The maximum live bitrate command 158 specifies a maximum bitrate BR2 that is lower than BR1. Accordingly, as depicted with a circle numbered 4 and a label "capped segment requests/responses 196," the endpoint application 190 switches to requesting and receiving from the edge server 140(1) segments of a different downloadable that is associated with the live event and has a bitrate of BR2.

Advantageously, as illustrated by the above example, limiting client devices to requesting and streaming segments of downloadables associated with lower bitrates can substantially reduce both the network traffic to and from one or more of the edge servers 140 as well as overall network traffic within the CDN 130, which can mitigate the risk of playback interruptions during the live event.

Please note that the techniques described herein are illustrative rather than restrictive and can be altered without departing from the broader spirit and scope of the invention. Many modifications and variations on the functionality provided by the video processing pipeline 120, the origin server 128, the CDN 130, the caching servers 132, the edge servers 140, the health application 150, the bitrate restriction application 156, the streaming control services 160, the ABL application 170, the CDN control application 174, the steering application 178, the client device 180, and the endpoint application 190 will be apparent to those of ordinary skill in the art without departing from the scope and spirit of the described embodiments.

In particular, the techniques described herein can be modified and applied to limiting streaming bitrates for any number of live video feeds associated with any number of live events. Further, any number of the ABL application 170, the CDN control application 174, the steering application 178, and the endpoint application 190 can collaborate to limit streaming bitrates associated with any number and/or types of network traffic (e.g., network traffic associated with any number of live events and/or any number of static video sources. In various embodiments, the ABL application 170 can generate any number of ABL policies for any number and/or types of groups of one or more edge servers 140 instead of or in addition to individual edge servers, stacks, countries, and ASNs. In the same or other embodiments, the ABL application 170 can generate any number of ABL policies based on any number of fallback bitrate lists associated with any number of live video feeds and/or any number of live events, and the techniques described herein are modified accordingly.

It will be apparent to one skilled in the art that the inventive concepts may be practiced without one or more of these specific details. For instance, in some alternate embodiments, the steering application 178 does not generate manifest files that include maximum bitrates. In the same or other embodiments, the ABL application 170 can cause any number of edge servers 140 to implement any number of ABL policies in any technically feasible fashion, and each edge server 140 can limit streaming bitrates for any number of client devices based on any number of ABL policies in any technically feasible fashion.

The storage, organization, amount, and/or types of data described herein are illustrative rather than restrictive and can be altered without departing from the broader spirit and scope of the embodiments. In that regard, many modifications and variations on the live video feed 102, the encoding ladder 104, the segments 122, the fallback bitrate list 106, the CDN topology data 108, the ABL policy set 172, ABL policies, and maximum live bitrate commands as described herein will be apparent to those of ordinary skill in the art without departing from the scope and spirit of the described embodiments.

It will be appreciated that the system 100 shown herein is illustrative and that variations and modifications are possible. For example, the functionality provided by the video processing pipeline 120, the origin server 128, the CDN 130, the caching servers 132, the edge servers 140, the health application 150, the bitrate restriction application 156, the streaming control services 160, the ABL application 170, the CDN control application 174, the steering application 178, the client device 180, and the endpoint application 190 as described herein can be integrated into or distributed across any number of software applications (including one), hardware devices (e.g., a hardware-based encoder), and any number of components of the system 100. Further, the connection topology between the various units in FIG. 1 can be modified as desired.

Determining ABL Policies Based on ABL Health Values

Figure 2:
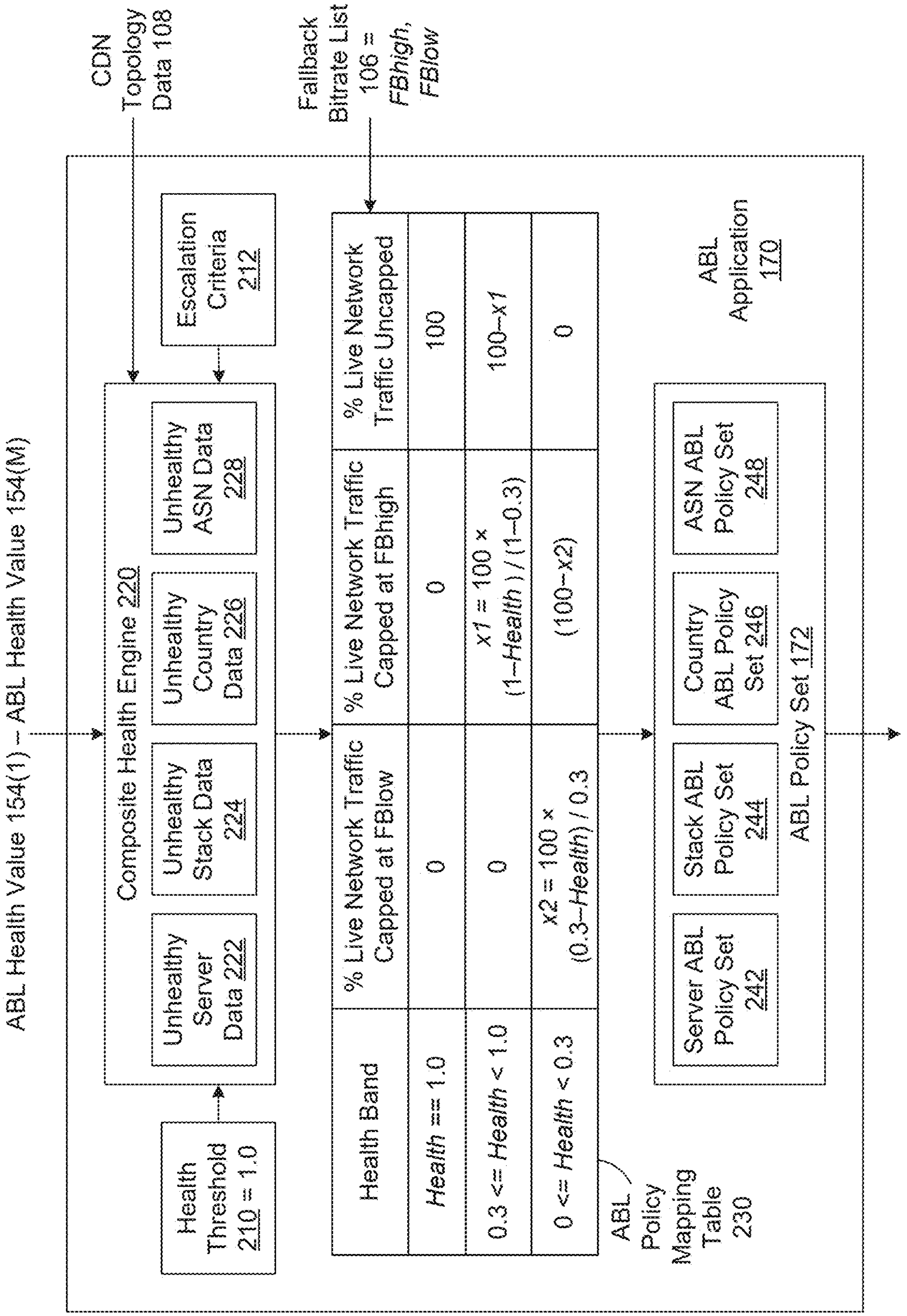
FIG. 2 is a more detailed illustration of the adaptive bitrate ladder application of FIG. 1, according to various embodiments.

FIG. 2 is a more detailed illustration of the ABL application 170 of FIG. 1, according to various embodiments. As described previously herein in conjunction with FIG. 1, the ABL application 170 generates the ABL policy set 172 based on the ABL health value 154(1)-the ABL health value 154(M), the CDN topology data 108, and the fallback bitrate list 106.

As described previously herein in conjunction with FIG. 1, the CDN topology data 108 includes, without limitation, any amount and/or types of data associated with the topology of the CDN 130. In some embodiments (including the embodiment depicted in FIG. 2), the CDN topology data 108 describes stacks of edge servers 140, groups of edge servers 140 that are associated with each of any number of Autonomous System Numbers (ASNs), and groups of edge servers 140 that are associated with each of any number of countries. The CDN topology data 108 can be generated in any technically feasible fashion.

As described previously herein in conjunction with FIG. 1, the fallback bitrate list 106 includes, without limitation, any number of fallback bitrates, where each fallback bitrate is associated with a different fallback bitrate-resolution point included in the encoding ladder 104 used to stream the live event. As used herein, a "fallback bitrate-resolution point" is a bitrate-resolution point included in the encoding ladder 104 that provides a visually effective fallback for one or more bitrate-resolution points included in the encoding ladder 104 that are prohibited when a corresponding maximum bitrate is imposed. The fallback bitrate list 106 can be generated in any technically feasible fashion.

For explanatory purposes only, functionality of the ABL application 170 is depicted in and described in conjunction with FIG. 2 in the context of an exemplary version of the fallback bitrate list 106 that includes two fallback bitrates. As persons skilled in the art will recognize, the techniques described herein are illustrative rather than restrictive and can be altered and applied in other contexts without departing from the broader spirit and scope of the inventive concepts described herein. Many modifications and variations will be apparent to those of ordinary skill in the art without departing from the scope and spirit of the described embodiments. In particular, the techniques described in FIG. 2 can be altered to support any number of fallback bitrate lists associated with any number of encoding ladders used to stream any number of live events.

As shown, the fallback bitrate list 106 includes, without limitation, two fallback bitrates that are denoted herein as "FBhigh" and "FBlow." FBhigh is a first fallback bitrate that provides a significant reduction in live network traffic with an acceptable degradation in visual quality when a corresponding maximum bitrate is imposed on one or more client devices. FBlow is a second fallback bitrate that provides a larger reduction in live network traffic with a lowest acceptable level of visual quality when a corresponding maximum bitrate is imposed on one or more client devices. For instance, in some embodiments, the highest bitrate of any bitrate-resolution point included in the encoding ladder 104 is 8000 kbps, FBhigh is 4000 kbps and FBlow is 1500 kbps.

As shown, the ABL application 170 includes, without limitation, a composite health engine 220, a health threshold 210, escalation criteria 212, an ABL policy mapping table 230, and the ABL policy set 172. The composite health engine 220 generates unhealthy server data 222, unhealthy stack data 224, unhealthy country data 226, and unhealthy ASN data 228 based on the ABL health value 154(1)-the ABL health value 154(M), the CDN topology data 108, the health threshold 210, and the escalation criteria 212.

In some embodiments, the ABL health value 154(1)-the ABL health value 154(M) are floating-point numbers from 0.0 through 1.0 that correlate to an ability of the edge server 140(1)-the edge server 140(M), respectively, to effectively stream one or more live events. The ABL health values 154 can change over time as the ability of the edge servers 140 to effectively stream one or more live events change. For instance, if a second live event starts while a first live event is in progress, then one or more of the ABL health values could decrease in response to requests received by the edge servers 140 from client devices that start streaming the second live event.

As described previously herein in conjunction with FIG. 1, the ABL health values 154 and any number and or other ABL health values (e.g., composite ABL health values) that are each associated with a group of one or more of the edge servers 140 are values for an ABL health metric. The health threshold 210 specifies a threshold for the ABL health metric. As shown in italics, in some embodiments, the health threshold 210 is 1.0. If a value for the ABL health metric is below the health threshold 210, then the edge server 140 or the group of edge servers 140 associated with value is considered unhealthy, Otherwise, the edge server 140 or the group of edge servers 140 associated with the value is healthy.

The escalation criteria 212 specifies any number and/or types of criteria for "escalating" groups of unhealthy edge servers to unhealthy stacks, groups of unhealthy stacks to unhealthy countries, and groups of unhealthy stacks to unhealthy ASNs. For instance, in some embodiments, the escalation criteria 212 includes a stack escalation threshold (not shown), a country escalation threshold (not shown), and an ASN escalation criteria (not shown). In some embodiments, the stack escalation threshold, the country escalation threshold, and the ASN escalation thresholds are numbers or percentages.

The unhealthy server data 222, the unhealthy stack data 224, the unhealthy country data 226, and the unhealthy ASN data 228 specify any number of unhealthy edge servers, unhealthy stacks, unhealthy countries, and unhealthy ASNs, respectively, and corresponding ABL health values. The composite health engine 220 compares the ABL health values 154 to the health threshold 210 to generate an initial version of the unhealthy server data 222. More specifically, the composite health engine 220 identifies a subset of the ABL health values 154 that are less than the health threshold 210 and selects a corresponding "unhealthy" subset of the edge servers 140. The composite health engine 220 generates an initial version of the unhealthy server data 222 that specifies the unhealthy subset of the edge servers 140 and the corresponding ABL health values 154.

The composite health engine 220 generates the unhealthy stack data 224 based on the unhealthy server data 222, the CDN topology data 108, and the stack escalation threshold. For each stack in the CDN 130 as per the CDN topology data 108, if the number or percentage of unhealthy edge servers included in the stack exceeds the stack escalation threshold, then the composite health engine 220 designates the stack as unhealthy.

For each stack, the composite health engine 220 selects a subset of ABL heath values 154 corresponding to a subset of the edge servers 140 that are included in the stack and computes an ABL health value for the stack based on the selected subset of ABL health values 154. The composite health engine 220 can compute an ABL health value for a stack in any technically feasible fashion. For instance, in some embodiments, the composite health engine 220 sets the ABL health value for a stack equal to a median, minimum, or maximum ABL health value included in the subset of ABL health values 154 for the subset of edge servers 140 that are included in the stack.

The composite health engine 220 generates an initial version of the unhealthy stack data 224 that specifies the unhealthy stacks and the corresponding ABL health values. For each unhealthy edge server that is included in an unhealthy stack, the composite health engine 220 removes the unhealthy edge server and the corresponding ABL health value 154 from the unhealthy server data 222. In this fashion, the composite health engine 220 "escalates" any unhealthy edge server that is included in an unhealthy stack to the corresponding unhealthy stack.

The composite health engine 220 generates the unhealthy country data 226 based on the unhealthy stack data 224, the CDN topology data 108, and the country escalation threshold. For each country served by the CDN 130 as per the CDN topology data 108, if the number or percentage of unhealthy stacks that serve the country exceeds the country escalation threshold, then the composite health engine 220 designates the country as unhealthy. For each unhealthy country, the composite health engine 220 selects a subset of ABL heath values corresponding to a subset of the stacks that serve the country and computes an ABL health value for the country based on the selected subset of ABL health values. The composite health engine 220 can compute an ABL health value for an unhealthy country in any technically feasible fashion. For instance, in some embodiments, the composite health engine 220 sets the ABL health value for an unhealthy country equal to a median, minimum, or maximum ABL health value included in ABL health values for the stacks that serve the country.

The composite health engine 220 then generates the unhealthy country data 226 that specifies the unhealthy countries and the corresponding ABL health values. The composite health engine 220 removes unhealthy stacks that serve unhealthy countries and the corresponding ABL health values from the unhealthy stack data 224. In this fashion, the composite health engine 220 escalates unhealthy stacks that serve unhealthy countries to the corresponding unhealthy countries.

The composite health engine 220 generates the unhealthy ASN data 228 based on the unhealthy stack data 224, the CDN topology data 108, and the ASN escalation threshold. For each ASN served by the CDN 130 as per the CDN topology data 108, if the number or percentage of unhealthy stacks that serve the ASN exceeds the ASN escalation threshold, then the composite health engine 220 designates the ASN as unhealthy. For each unhealthy ASN, the composite health engine 220 selects a subset of ABL heath values corresponding to a subset of the stacks that serve the ASN and computes an ABL health value for the ASN based on the selected subset of ABL health values. The composite health engine 220 can compute an ABL health value for an ASN in any technically feasible fashion. For instance, in some embodiments, the composite health engine 220 sets the ABL health value for an ASN equal to a median, minimum, or maximum ABL health value included in ABL health values for the stacks that serve the country.

The composite health engine 220 then generates unhealthy ASN data 228 that specifies the unhealthy ASNs and the corresponding ABL health values. The composite health engine 220 removes any unhealthy stack that is included in an unhealthy ASN and the corresponding ABL health value from the unhealthy stack data 224. In this fashion, the composite health engine 220 escalates unhealthy stacks that serve unhealthy ASNs to the corresponding unhealthy ASNs.

As shown, the ABL application 170 generates the ABL policy set 172 based on the unhealthy server data 222, the unhealthy stack data 224, the unhealthy country data 226, the unhealthy ASN data 228, the ABL policy mapping table 230, and the fallback bitrate list 106. The ABL policy set 172 includes, without limitation, a server ABL policy set 242, a stack ABL policy set 244, a country ABL policy set 246, and an ASN ABL policy set 248. The server ABL policy set 242 includes a different ABL policy for each edge server 140 included in the unhealthy server data 222. The stack ABL policy set 244 includes a different ABL policy for each stack included in the unhealthy stack data 224. The country ABL policy set 246 includes a different ABL policy for each country included in the unhealthy country data 226. The ASN ABL policy set 248 includes a different ASN policy for each ASN included in the unhealthy ASN data 228.

As described previously herein, each ABL policy includes zero or more maximum bitrates and zero or more percentages of live network traffic to which the maximum bitrates should be applied. In some embodiments, to generate an ASN policy for an edge server, a stack, a country, or an ASN, the ABL application 170 maps the corresponding ASN health value to zero or more maximum bitrates and zero or more percentages of live network traffic to which the maximum bitrates should be applied based on the ABL policy mapping table 230 and the fallback bitrate list 106. The ABL application 170 then generates the ASN policy that specifies any maximum bitrates and any percentages of live network traffic to which the maximum bitrates should be applied.

As shown, the ABL policy mapping table 230 includes, without limitation, three health bands, where an input ABL health value denoted as "Health" is used to select one of the three health bands that is applicable to the input ABL health value. Each health band includes a "percentage (%) live network traffic capped at FBlow," a "% live network traffic capped at FBhigh," and a "% live network traffic uncapped." For each health band, the sum of the % live network traffic capped at FBlow, the % live network traffic capped at FBhigh, and the "% live network traffic uncapped is equal to 100%.

As shown, a Health that is equal to 1.0 corresponds to a first health band. The first health band specifies that 0% of live network traffic is capped at FBlow, 0% of live network traffic is capped at FBhigh, and 100% of live network traffic is uncapped. Accordingly, an input ABL health value of 1.0 maps to no maximum bitrates and therefore an empty ABL policy.

As shown, a Health that is less than 1.0 and greater than or equal to 0.3 corresponds to a second health band. The second health band specifies that 0% of live network traffic is capped at FBlow, x1% of live network traffic is capped at FBhigh, and (100−x1)% of live network traffic is uncapped, where x1 is equal to 100×(1−Health)/(1−0.3))%. Accordingly, an input ABL health value that is less than 1.0 and greater than or equal to 0.3 maps to an ABL policy that specifies a maximum bitrate of FBhigh and (100×(1−Health)/(1−0.3))% of live network traffic to which FBhigh should be applied.

As shown, a Health that is less than 0.3 and greater than or equal to 0.0 corresponds to a third health band. The third health band specifies that x2% of live network traffic is capped at FBlow, (100−x2)% of live network traffic is capped at FBhigh, and 0% of live network traffic is uncapped, where x2 is equal to 100×(0.3−Health)/0.3)%. Accordingly, an input ABL health value that is less than 0.3 and greater than or equal to 0.0 maps to an ABL policy that includes two maximum bitrates and two live percentages of live network traffic to which the maximum bitrates, respectively, are to be applied. More specifically, the ABL policy specifies that a maximum bitrate of FBlow is to be applied to (100×(0.3−Health)/0.3))% of live network traffic and a maximum bitrate of FBhigh is to be applied to the remainder of live network traffic.

Advantageously, in accordance with the ABL policy mapping table 230, live network traffic associated with unhealthy edge servers, unhealthy stacks, unhealthy countries, and unhealthy ASNs included in the CDN 130 can be adaptively capped and uncapped based on the corresponding ABL health values. In the embodiment depicted in FIG. 2, no corresponding live network traffic is capped based on a Health of 1.0. As Health decreases from 1.0 to 0.3, a percentage of corresponding live network traffic that is uncapped gradually decreases from 100% to 0% and a percentage of corresponding live network traffic that is capped at FBhigh gradually increases from 0% to 100%. As Health decreases from 0.3 to 0.0, a percentage of corresponding live network traffic that is capped at FBhigh gradually decreases from 100% to 0% and a percentage of corresponding live network traffic that is capped at FBlow gradually increases from 0% to 100%.

Figure 3:
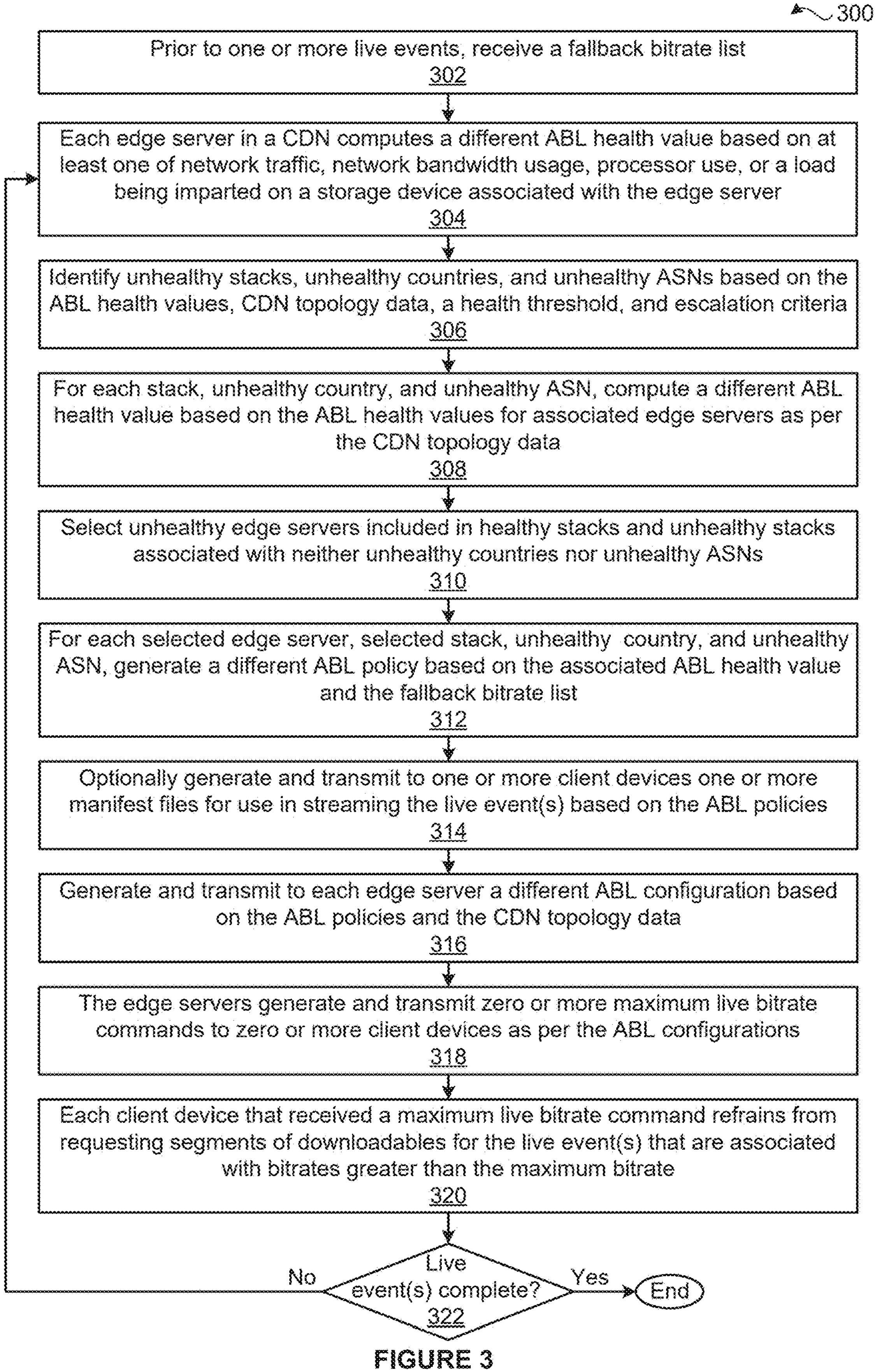
FIG. 3 is a flow diagram of method steps for selectively limiting streaming bitrates during live events, according to various embodiments.

FIG. 3 is a flow diagram of method steps for selectively limiting streaming bitrates during live events, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where prior to one or more live events, the ABL application 170 receives fallback bitrate list 106. At step 304, each edge server in CDN 130 computes a different ABL health value based on at least one of network traffic, network bandwidth usage, processor use, or a load being imparted on a storage device associated with the edge server. At step 306, the ABL application 170 identifies unhealthy stacks, unhealthy countries, and unhealthy ASNs based on the ABL health values, CDN topology data, a health threshold, and escalation criteria. At step 308, for each stack, unhealthy country, and unhealthy ASN, the ABL application 170 computes a different ABL health value based on the ABL health values for associated edge servers as per the CDN topology data.

At step 310, the ABL application 170 selects unhealthy edge servers included in healthy stacks and unhealthy stacks associated with neither unhealthy countries nor unhealthy ASNs. At step 312, for each selected edge server, selected stack, unhealthy country, and unhealthy ASN, the ABL application 170 generates a different ABL policy based on the associated ABL health value and the fallback bitrate list 106.

At step 314, the steering application 178 optionally generates and transmits to one or more client devices one or more manifest files for use in streaming the live event(s) based on the ABL policies. At step 316, the ABL application 170 generates and transmits to each edge server a different ABL configuration based on the ABL policies and the CDN topology data.

At step 318, the edge servers generate and transmit zero or more maximum live bitrate commands to zero or more client devices as per the ABL configurations. At step 320, each client device that received a maximum live bitrate command refrains from requesting segments of downloadables for the live event(s) that are associated with bitrates greater than the maximum bitrate.

At step 322, the ABL application 170 determines whether the live event(s) are complete. If, at step 322, the ABL application 170 determines that any of the live event(s) are not complete, then the method 300 returns to step 304, where each edge server in the CDN 130 computes a different ABL health value based on at least one of network traffic, network bandwidth usage, processor use, or a load being imparted on a storage device associated with the edge server. If, however, at step 322, the ABL application 170 determines that all the live event(s) are complete, then the method 300 terminates.

In sum, the disclosed techniques can be used to adaptively and selectively impose maximum bitrates for streaming live events on any number of client devices during a live event. In some embodiments, prior to a live event, an ABL application receives a fallback bitrate list. The fallback bitrate list includes one or more fallback bitrates that can be designated as maximum bitrates for selected client devices to prohibit those client devices from requesting segments of downloadables associated with the live event and bitrates higher than the maximum bitrates. Periodically throughout the live event, each edge server included in a CDN computes and transmits to the ABL application a different ABL health value based on at least one of network traffic, network bandwidth usage, processor use, or a load being imparted on a storage device associated with the edge server In response to receiving new ABL health values from the edge servers, the ABL application compares the ABL health values to a health threshold to identify unhealthy edge servers. The ABL application determines whether each stack, ABL, and country associated with the CDN is unhealthy based on the unhealthy edge servers, escalation criteria, and CDN topology data. For each unhealthy stack, each unhealthy ABL, and each unhealthy country, the ABL computes an associated ABL health value based on the ABL health values of the associated edge servers. The ABL application selects unhealthy edge servers that are included in healthy stacks and selects unhealthy stacks that are associated with neither unhealthy ABLs nor unhealthy countries as per the CDN topology data. For each selected unhealthy edge server, each selected unhealthy stack, each unhealthy ABL, and each unhealthy country, the ABL application maps the associated ABL health value to a different ABL policy via an ABL policy mapping table, and the fallback bitrate list. Each ABL policy specifies one or more maximum bitrates, where each maximum bitrate is associated with a different percentage of live streaming traffic to which the maximum bitrate should be imposed.

The ABL application stores the ABL policies for use by a steering application and a CDN control application. Subsequently, as part of setting up each new streaming session associated with the live event, the steering application generates and transmits to the associated client device a new manifest file based, at least in part, on the ABL policies. In response to changes in the stored ABL policies, the CDN control application determines a new ABL configuration for each of the edge servers based on the ABL policies and the CDN topology data. Each ABL configuration specifies a subset of the ABL policies that are applicable to the associated edge server.

Upon receiving a new ABL configuration, a bitrate restriction application executing on an edge server generates and transmits to any number (including none) of the associated client devices any number of maximum live bitrate commands as per the new ABL configuration. Each maximum live bitrate command specifies a maximum bitrate that is to be imposed when streaming the live event to the client device. Upon receiving a maximum live bitrate command, an endpoint application executing on a client device refrains from requesting any segments of any downloadable that is associated with the live event and a bitrate greater than the maximum bitrate specified in the maximum live bitrate command.

At least one technical advantage of the disclosed techniques relative to the prior art is that, with the disclosed techniques, if network traffic to and from a given group of edge servers in a CDN exceeds during a live event a pre-determined threshold, then the group of edge servers can impose on any number of corresponding client devices a maximum bitrate associated with the downloadables requested by those client devices. Limiting client devices to requesting and streaming segments of downloadables associated with lower bitrates can substantially reduce both the network traffic to and from the given group of edge servers as well as overall network traffic within the CDN, which can mitigate the risk of playback interruptions during the live event. These technical advantages provide one or more technological improvements over prior art approaches.

1. In some embodiments, a computer-implemented method for limiting streaming bitrates during live events comprises receiving a first value from a first edge server included in a CDN; determining a first policy based on the first value, wherein the first policy includes a first maximum bitrate for streaming downloadables associated with a live event; and transmitting the first policy to the first edge server, wherein the first edge server implements the first policy to prohibit a first client device from requesting a first segment of a first downloadable that is associated with the live event and has a first bitrate that exceeds the first maximum bitrate.
2. The computer-implemented method of clause 1, wherein the first value is computed based on at least one of first network traffic, network bandwidth usage, processor use, or a load being imparted on a first storage device associated with the first edge server.
3. The computer-implemented method of clauses 1 or 2, wherein determining the first policy comprises selecting the first maximum bitrate from a plurality of fallback bitrates associated with an encoding ladder used to stream the live event based on the first value.
4. The computer-implemented method of any of clauses 1-3, wherein determining the first policy comprises mapping the first value to the first maximum bitrate and a first percentage of network traffic to which the first maximum bitrate should be applied.
5. The computer-implemented method of any of clauses 1-4, wherein determining the first policy comprises computing a composite value based on the first value and a second value associated with a second edge server included in the CDN; and mapping the composite value to the first maximum bitrate and a first percentage of network traffic to which the first maximum bitrate should be applied.

6. The computer-implemented method of any of clauses 1-5, wherein the first edge server and the second edge server are associated with at least one of a first router, a first Autonomous System Number, or a first country.

7. The computer-implemented method of any of clauses 1-6, further comprising generating a manifest file that includes the first maximum bitrate for use when streaming the live event; and transmitting the manifest file to a second client device.

8. The computer-implemented method of any of clauses 1-7, wherein determining the first policy comprises mapping the first value to a plurality of maximum bitrates that includes the first maximum bitrate and a plurality of percentages of network traffic to which the plurality of maximum bitrates should be applied.

9. The computer-implemented method of any of clauses 1-8, further comprising receiving a second value from a second edge server included in the CDN; determining a second policy based on the second value, wherein the second policy includes a second maximum bitrate for the downloadables associated with the live event; and transmitting the second policy to the second edge server, wherein the second edge server implements the second policy to prohibit a second client device from requesting a second segment of a second downloadable that is associated with the live event and has a second bitrate that exceeds the second maximum bitrate.

10. The computer-implemented method of any of clauses 1-9, wherein the first policy is associated with a first Autonomous System Number or a first country and further comprising determining a second policy that includes the first maximum bitrate and is associated with a second Autonomous System Number or a second country based on the first value; and transmitting the second policy to the first edge server, wherein the first edge server prohibits a second client device from requesting the first segment of the first downloadable based on the second policy.

11. In some embodiments, one or more non-transitory computer readable media include instructions that, when executed by one or more processors, cause the one or more processors to limit streaming bitrates during live events by performing the steps of receiving a first value from a first edge server included in a CDN; determining a first policy based on the first value, wherein the first policy includes a first maximum bitrate for streaming downloadables associated with a live event; and transmitting the first policy to the first edge server, wherein the first edge server implements the first policy to prohibit a first client device from requesting a first segment of a first downloadable that is associated with the live event and has a first bitrate that exceeds the first maximum bitrate.

12. The one or more non-transitory computer readable media of clause 11, wherein the first value is computed based on at least one of first network traffic, network bandwidth usage, processor use, or a load being imparted on a first storage device associated with the first edge server.

13. The one or more non-transitory computer readable media of clauses 11 or 12, wherein determining the first policy comprises selecting the first maximum bitrate from a plurality of fallback bitrates associated with an encoding ladder used to stream the live event based on the first value.

14. The one or more non-transitory computer readable media of any of clauses 11-13, wherein determining the first policy comprises mapping the first value to the first maximum bitrate and a first percentage of network traffic to which the first maximum bitrate should be applied.

15. The one or more non-transitory computer readable media of any of clauses 11-14, wherein determining the first policy comprises setting a second value equal to a median, minimum, or maximum value included in a first plurality of values that includes the first value and is associated with a first plurality of edge servers that includes the first edge server; and mapping the second value to the first maximum bitrate and a first percentage of network traffic to which the first maximum bitrate should be applied.

16. The one or more non-transitory computer readable media of any of clauses 11-15, further comprising selecting the first plurality of edge servers based on topology data associated with the CDN and at least one of a first router, a first Autonomous System Number, or a first country.

17. The one or more non-transitory computer readable media of any of clauses 11-16, further comprising generating a manifest file that includes the first maximum bitrate for use when streaming the live event; and transmitting the manifest file to a second client device.

18. The one or more non-transitory computer readable media of any of clauses 11-17, wherein determining the first policy comprises mapping the first value to a plurality of maximum bitrates that includes the first maximum bitrate and a plurality of percentages of network traffic to which the plurality of maximum bitrates should be applied.

19. The one or more non-transitory computer readable media of any of clauses 11-18, further comprising transmitting the first policy to a second edge server included in the CDN, wherein the second edge server prohibits a second client device from requesting the first segment of the first downloadable.

20. In some embodiments, a system comprises one or more memories storing instructions and one or more processors coupled to the one or more memories that, when executing the instructions, perform the steps of receiving a first value from a first edge server included in a CDN; determining a first policy based on the first value, wherein the first policy includes a first maximum bitrate for streaming downloadables associated with a live event; and transmitting the first policy to the first edge server, wherein the first edge server implements the first policy to prohibit a first client device from requesting a first segment of a first downloadable that is associated with the live event and has a first bitrate that exceeds the first maximum bitrate.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for limiting streaming bitrates during live events, the method comprising:

receiving a first value from a first edge server included in a CDN;

determining a first policy based on the first value, wherein the first policy includes a first maximum bitrate for streaming downloadables associated with a live event; and transmitting the first policy to the first edge server, wherein the first edge server implements the first policy to prohibit a first client device from requesting a first segment of a first downloadable that is associated with the live event and has a first bitrate that exceeds the first maximum bitrate.

2. The computer-implemented method of claim 1, wherein the first value is computed based on at least one of first network traffic, network bandwidth usage, processor use, or a load being imparted on a first storage device associated with the first edge server.

3. The computer-implemented method of claim 1, wherein determining the first policy comprises selecting the first maximum bitrate from a plurality of fallback bitrates associated with an encoding ladder used to stream the live event based on the first value.

4. The computer-implemented method of claim 1, wherein determining the first policy comprises mapping the first value to the first maximum bitrate and a first percentage of network traffic to which the first maximum bitrate should be applied.

5. The computer-implemented method of claim 1, wherein determining the first policy comprises:

computing a composite value based on the first value and a second value associated with a second edge server included in the CDN; and mapping the composite value to the first maximum bitrate and a first percentage of network traffic to which the first maximum bitrate should be applied.

6. The computer-implemented method of claim 5, wherein the first edge server and the second edge server are associated with at least one of a first router, a first Autonomous System Number, or a first country.

7. The computer-implemented method of claim 1, further comprising:

generating a manifest file that includes the first maximum bitrate for use when streaming the live event; and transmitting the manifest file to a second client device.

8. The computer-implemented method of claim 1, wherein determining the first policy comprises mapping the first value to a plurality of maximum bitrates that includes the first maximum bitrate and a plurality of percentages of network traffic to which the plurality of maximum bitrates should be applied.

9. The computer-implemented method of claim 1, further comprising:

receiving a second value from a second edge server included in the CDN;

determining a second policy based on the second value, wherein the second policy includes a second maximum bitrate for the downloadables associated with the live event; and transmitting the second policy to the second edge server, wherein the second edge server implements the second policy to prohibit a second client device from requesting a second segment of a second downloadable that is associated with the live event and has a second bitrate that exceeds the second maximum bitrate.

10. The computer-implemented method of claim 1, wherein the first policy is associated with a first Autonomous System Number or a first country and further comprising:

determining a second policy that includes the first maximum bitrate and is associated with a second Autonomous System Number or a second country based on the first value; and transmitting the second policy to the first edge server, wherein the first edge server prohibits a second client device from requesting the first segment of the first downloadable based on the second policy.

11. One or more non-transitory computer readable media including instructions that, when executed by one or more processors, cause the one or more processors to limit streaming bitrates during live events by performing the steps of:

receiving a first value from a first edge server included in a CDN;

determining a first policy based on the first value, wherein the first policy includes a first maximum bitrate for streaming downloadables associated with a live event; and transmitting the first policy to the first edge server, wherein the first edge server implements the first policy to prohibit a first client device from requesting a first segment of a first downloadable that is associated with the live event and has a first bitrate that exceeds the first maximum bitrate.

12. The one or more non-transitory computer readable media of claim 11, wherein the first value is computed based on at least one of first network traffic, network bandwidth usage, processor use, or a load being imparted on a first storage device associated with the first edge server.

13. The one or more non-transitory computer readable media of claim 11, wherein determining the first policy comprises selecting the first maximum bitrate from a plurality of fallback bitrates associated with an encoding ladder used to stream the live event based on the first value.

14. The one or more non-transitory computer readable media of claim 11, wherein determining the first policy comprises mapping the first value to the first maximum bitrate and a first percentage of network traffic to which the first maximum bitrate should be applied.

15. The one or more non-transitory computer readable media of claim 11, wherein determining the first policy comprises:

setting a second value equal to a median, minimum, or maximum value included in a first plurality of values that includes the first value and is associated with a first plurality of edge servers that includes the first edge server; and mapping the second value to the first maximum bitrate and a first percentage of network traffic to which the first maximum bitrate should be applied.

16. The one or more non-transitory computer readable media of claim 15, further comprising selecting the first plurality of edge servers based on topology data associated with the CDN and at least one of a first router, a first Autonomous System Number, or a first country.

17. The one or more non-transitory computer readable media of claim 11, further comprising:

generating a manifest file that includes the first maximum bitrate for use when streaming the live event; and transmitting the manifest file to a second client device.

18. The one or more non-transitory computer readable media of claim 11, wherein determining the first policy comprises mapping the first value to a plurality of maximum bitrates that includes the first maximum bitrate and a plurality of percentages of network traffic to which the plurality of maximum bitrates should be applied.

19. The one or more non-transitory computer readable media of claim 11, further comprising transmitting the first policy to a second edge server included in the CDN, wherein the second edge server prohibits a second client device from requesting the first segment of the first downloadable.

20. A system comprising:

one or more memories storing instructions; and one or more processors coupled to the one or more memories that, when executing the instructions, perform the steps of:

receiving a first value from a first edge server included in a CDN;

determining a first policy based on the first value, wherein the first policy includes a first maximum bitrate for streaming downloadables associated with a live event; and transmitting the first policy to the first edge server, wherein the first edge server implements the first policy to prohibit a first client device from requesting a first segment of a first downloadable that is associated with the live event and has a first bitrate that exceeds the first maximum bitrate.

* * * * *